United States Patent [19]

Takehara et al.

[11] Patent Number: 5,540,025
[45] Date of Patent: Jul. 30, 1996

[54] FLOORING MATERIAL FOR BUILDING

[75] Inventors: Akihiro Takehara, Kyoto-fu; Hideto Fujii, Tottori-ken, both of Japan

[73] Assignee: Daiken Trade & Industry Co., Ltd., Toyama-ken, Japan

[21] Appl. No.: 198,264

[22] Filed: Feb. 18, 1994

[30] Foreign Application Priority Data

May 29, 1993 [JP] Japan .................................. 5-151603
May 29, 1993 [JP] Japan .................................. 5-151604

[51] Int. Cl.⁶ ............................ F04F 15/10; F04F 15/16
[52] U.S. Cl. .................... 52/403.1; 52/309.8; 52/309.13; 52/506.01; 52/592.1; 428/136; 428/157
[58] Field of Search .................... 52/403.1, 309.8, 52/309.13, 506.01, 480, 177, 390, 592.1; 428/323, 134, 136, 156, 157

[56] References Cited

U.S. PATENT DOCUMENTS 2,961,029  11/1960  Rainar ...................... 428/332
3,684,630  8/1972  Sesenig et al. ............. 52/309.8

FOREIGN PATENT DOCUMENTS 358546   10/1989  Japan .
4113644  3/1991   Japan .
1407655  9/1975   United Kingdom .............. 52/309.8

Primary Examiner—Michael Safavi
Attorney, Agent, or Firm—Sixbey, Friedman, Leedom & Ferguson, P.C.; Gerald J. Ferguson, Jr.; Tim L. Brackett, Jr.

[57] ABSTRACT

A flooring material for building comprises a wood overlaid board having a pair of side faces parallel to each other and a flexible sheet which is integrally layered on the back face of the wood overlaid board. The lower portion of the wood overlaid board is provided with a plurality of nick grooves which extend from one side face to the other side face. The nick grooves are formed to such a depth and at such an interval as to impart the wood overlaid board with flexibility. The product of the specific gravity and thickness of the flexible sheet is larger than the product of the specific gravity and thickness of the wood overlaid board, thereby positioning the center of gravity of the flooring material for building in the flexible sheet.

7 Claims, 2 Drawing Sheets

FLOORING MATERIAL FOR BUILDING

BACKGROUND OF THE INVENTION

The present invention relates to a flooring material for building and, more particularly, it relates to a flooring material which can be installed with high precision by simply placing it on a flat subfloor such as a wood subfloor composed of plywood or particle board, a concrete subfloor composed of RC, or an OA floor, without using an adhesive.

Among conventional flooring materials to be installed on subfloors, a material consisting of a solid or multi-ply floorboard and of a fiber mat or cushion sheet is well known. In the conventional flooring material, the fiber mat or cushion sheet is attached to the back face of the solid or multi-ply floorboard, serving as the base board, in order to improve its sound insulation. This type of floorboard is attached onto a subfloor by means of an adhesive. In this case, however, since the base board composing the flooring material has large rigidity and hence is inferior in flexibility, the fitting condition between the flooring material and subfloor also becomes inferior if the flooring material is installed on an uneven subfloor. Moreover, the adhesive must be applied in the execution of flooring. Furthermore, the renewal of the flooring material will be difficult since it is attached to the subfloor by means of the adhesive.

To overcome the difficulties, a flooring material shown in FIGS. 4 and 5 has been proposed. The flooring material is imparted with flexibility by forming a plurality of nick grooves B in the back face of a wood overlaid base board A in the shape of a rectangle having an overlay material thereon. The nick grooves B are spaced at proper intervals in the longitudinal direction of the base board A and extend in the lateral direction of the base board A while penetrating it. On the back face of the wood overlaid board A is integrally layered a thin elastic sheet C. For the purpose of joining adjacent pieces of the flooring material together, one longitudinal side face of the wood overlaid board A is formed with a tongue D, while the other longitudinal side face thereof is formed with a groove E.

Although the flooring material can be installed on the subfloor without using an adhesive or nails, it has the following disadvantage in the case where the surface of the subfloor is slightly curved. That is, though the wood overlaid board A is formed with a large number of nick grooves B at its lower portion, the flooring material spreads only in the horizontal direction due to its rigidity. The flooring material can be fitted to the surface of the subfloor only by the application of an external force. However, even if the external force applied makes the flooring material fit the surface of the subfloor, the flooring material will lift up from the subfloor by resilience when the external force is removed. This not only impairs the outward appearance of the finished floor but also causes a squeaking-floor phenomenon when a person walks on the floor.

Such a disadvantage can be prevented by increasing the depth of the nick groove B. However, if the depth of the nick groove B is increased, the overall strength of the flooring material is decreased, resulting in the breakage of the wood overlaid board A or in the rupture of the elastic sheet C placed on the back face of the wood overlaid board A due to its own expansion and contraction.

Moreover, if the wood overlaid board A is warped or distorted, the elastic sheet C placed on the back face thereof is also deformed in accordance with the warp or distortion of the wood overlaid board A. Therefore, it becomes difficult to keep the elastic sheet C in contact with the entire surface of the subfloor, though the elastic sheet C is provided so as to absorb the unevenness of the subfloor. Consequently, spaces are generated in places between the flooring material and the subfloor, which may cause the squeaking of the floor mentioned above or generate a difference in level or space at the joint of adjacent pieces of the flooring material, so that the flooring material cannot be installed with high precision.

Furthermore, since the tongue D is provided in one side face of the wood overlaid board A, if the depth of the nick groove B is increased, the tongue D is completely divided into a large number of pieces d by the nick grooves B. Consequently, there are cases in which the tongues D are broken during carriage or execution, so that not only the market value of the flooring material is lowered but also a strong joint cannot be obtained between adjacent pieces of the flooring material when they are joined together by fitting the tongues D into the groove E. To solve the problem, a reinforcing sheet may be attached to the tongues D over the top or back faces thereof. However, this not only adds extra labor to the fabrication process but also causes the following problem. That is, the reinforcing sheet decreases the flexibility of the flooring material which has been increased by the formation of the nick grooves B, thus deteriorating the fitting property of the flooring material with respect to the uneven subfloor. As a result, a difference in level is generated at the joint of adjacent pieces of the flooring material, so that the flooring material cannot be installed with high precision and that the floor squeaks to footsteps because of the lifting up of the flooring material from the surface of the subfloor.

Conversely, if the depth of the nick groove B in the back face of the wood overlaid board A is reduced, the pieces d are integrated at their upper portion, so that the strength of the tongue D is increased. However, this lowers the flexibility of the flooring material, so that the fitting property with respect to the subfloor is deteriorated and therefore the flooring material cannot be installed with high precision, either, similarly to the foregoing case.

Moreover, since the tongue D and groove E are formed only on the side faces of the wood overlaid board A, the fitting condition between the tongue D and groove E is not excellent, so that a fitting operation in joining two pieces of the flooring material requires more labor. In the case where the wood overlaid board A is warped or distorted, the fitting operation itself may become substantially impossible.

SUMMARY OF THE INVENTION

In view of the foregoing, an object of the present invention is to provide a flooring material which can be installed by simply placing it on a subfloor and which presents an excellent fitting property with respect to the subfloor even when the subfloor is uneven or curved. Another object of the present invention is to provide a flooring material in which the strength of a tongue formed on its side face is increased so that the tongue is not broken during carriage or execution.

A first flooring material for building according to the present invention is intended to attain the above first object and comprises: a wood overlaid board having a pair of side faces parallel to each other; and a flexible sheet having bending elasticity which is integrally layered on the back face of said wood overlaid board, wherein the lower portion of said wood overlaid board is provided with a plurality of nick grooves which extend from one side face to the other side face, said nick grooves being formed to such a depth and at such an interval as to impart said wood overlaid board with flexibility, said flexible sheet has substantially the same area as that of said wood overlaid board, and the product of the specific gravity and thickness of said flexible sheet is larger than the product of the specific gravity and thickness of said wood overlaid board so as to position the center of gravity of said flooring material for building in said flexible sheet.

In the first flooring material for building, if its wood overlaid board is warped or twisted, the weight of the flexible sheet surmounts the rigidity of the wood overlaid board because the product of the specific gravity and thickness of the flexible sheet, which has been integrally layered on the back face of the wood overlaid board, is larger than the product of the specific gravity and thickness of the wood overlaid board. Consequently, the warp and distortion of the wood overlaid board can be canceled. On the other hand, if the subfloor is uneven or curved, the wood overlaid board is deformed along with the flexible sheet so as to fit the uneven or curved surface of the subfloor. That is, the flooring material is equipped with a function of deforming itself in accordance with the configuration of the subfloor without being deformed by the application of an external force to make it fit the subfloor.

When installed on the uneven or curved subfloor, the flooring material for building deforms itself in accordance with the configuration of the subfloor, so that the fitting condition between the flooring material and subfloor is improved, thereby preventing the phenomenon of the lifting up of the flooring material from the subfloor. Consequently, the floor does not squeak and a user feels comfortable while walking thereon.

Since the first flooring material for building deforms itself so as to fit the configuration of the subfloor, a space or difference in level is not generated between the side faces of adjacent pieces of the flooring material. As a result, the side faces of the flooring material are joined accurately, so that the flooring material can be installed with high precision, resulting in an excellent outward appearance of the floor.

Since the center of gravity of the first flooring material for building is inside the flexible sheet which has been integrated with the back face of the wood overlaid board, the installation of the flooring material can be accomplished by simply placing it on the subfloor without attaching it to the subfloor by means of an adhesive. The flooring material placed on the subfloor then deforms itself in accordance with the configuration of the subfloor. This greatly facilitates the installation of the flooring material and remarkably improves working efficiency.

Since the first flooring material for building is not attached to the subfloor with an adhesive, it is sufficient to simply lift the flooring material up from the subfloor if the flooring material is to be renewed. Therefore, the renewal of the flooring material can be accomplished with great ease and efficiency.

In the first flooring material for building, the specific gravity of the wood overlaid board is preferably 0.5 to 0.9 and the specific gravity of the flexible sheet is preferably 1.0 or more. Also, the specific gravity of the flexible sheet is preferably 1.5 times or larger than the specific gravity of the wood overlaid board. In this manner, the center of gravity of the flooring material for building can easily be positioned in the flexible sheet even when the wood overlaid board is thick.

A second flooring material for building according to the present invention is intended to attain the above second object and comprises: a wood overlaid board having a pair of side faces parallel to each other; and a flexible sheet having bending elasticity which is integrally layered on the back face of said wood overlaid board, wherein the lower portion of said wood overlaid board is provided with a plurality of nick grooves which extend from one side face to the other side face, said nick grooves being formed to such a depth and at such an interval as to impart said wood overlaid board with flexibility, said one side face is provided with a tongue, the upper portion of said tongue consisting of the lower portion of said wood overlaid board which has been divided into pieces by said nick grooves, while the lower portion of said tongue consisting of said flexible sheet, the individual pieces of the upper portion of said tongue generated by said nick grooves being combined with said flexible sheet, and said other side face is provided with a groove which ranges from said wood overlaid board to said flexible sheet.

In the second flooring material for building also, the wood overlaid board is provided with the nick grooves for imparting it with flexibility. Consequently, the second flooring material for building also deforms itself in accordance with the subfloor, so that a space or a difference in level is not generated between the side faces of adjacent pieces of the flooring material.

Moreover, since each of the tongue and groove is formed to range from the wood overlaid board to the flexible sheet, a flexible sheet composing the tongue and another flexible sheet composing the groove are in abutment with each other when the tongue is fitted into the groove. Consequently, even when the flooring material for building is slightly warped or distorted, the warp or distortion is absorbed by the elastic deformation of the flexible sheets, so that the tongue is smoothly fitted into the groove and that a difference in level or space is not generated between adjacent pieces of the flooring material.

Thus, in the second flooring material for building also, the side faces of the flooring material for building are joined accurately, so that the flooring material can be installed with high precision. Accordingly, not only the floor does not squeak in response to footsteps but also the appearance of the floor is improved.

In the second flooring material for building, since the upper portion of the tongue that has been divided by the nick grooves are combined with the flexible sheet, the tongue is not broken or damaged during carriage and execution.

In the second flooring material, the wood overlaid board and flexible sheet are preferably integrated with each other by means of a flexible adhesive. In this manner, the flexibility of the flooring material for building is maintained.

In the first and second flooring materials for building, the surface overlay layer of the wood overlaid board is preferably composed of a wood plastic combination. Since the strength of the wood overlaid board has been increased by the injected resin, the wood overlaid board will not be broken even if the toughness of the wood overlaid board is improved by increasing the depth of the nick grooves.

DETAILED DESCRIPTION OF THE PREFERRED EMBODIMENTS

Below, a flooring material for building F according to an embodiment of the present invention will be described with reference to the drawings.

Figure 1:
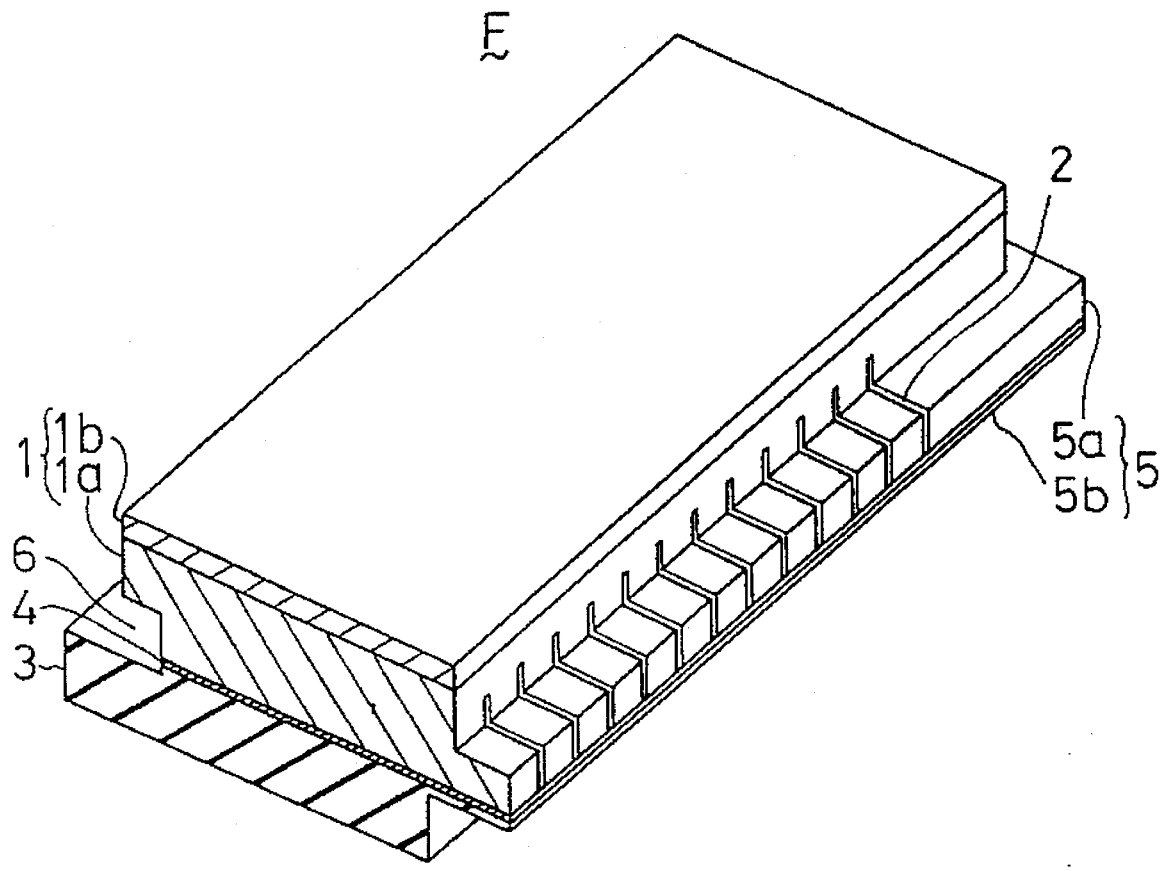
FIG. 1 is a perspective cross section of a flooring material for building according to an embodiment of the present invention.

As shown in FIG. 1, the flooring material for building F consists of a wood overlaid board 1 and a flexible sheet 3 that has been integrated with the back face of the wood overlaid board 1.

The wood overlaid board 1 is formed in the shape of a rectangle having a specified width in its lateral direction and a specified length in its longitudinal direction. The wood overlaid board 1 consists of: a wood base board 1a composed of 3 to 7 plies, particle board, MDF (Medium Density Fiber Board), and the like having a specific gravity of 0.5 to 0.9 and; a surface overlay layer 1b composed of a thin veneer, WPC (Wood Plastic Combination) board, or plastic overlay sheet, which has been integrally formed on the top surface of the wood base board 1a.

The dimensions of the wood overlaid board 1 are not particularly specified, but preferably, its length in the lateral direction is 50 to 300 mm, its length in the longitudinal direction is 600 to 1800 mm, and its thickness is 3 to 9 mm.

The lower portion of the wood overlaid board 1 is provided with nick grooves 2 which were formed at regular intervals of 10 to 100 mm in the longitudinal direction by means of a cutting tool such as a saw so as to penetrate the wood overlaid board 1 in the lateral direction. The nick grooves 2 extend upward from the back face of the wood overlaid board 1 and their depth is 1/3 or more of the thickness of the wood overlaid board 1. Accordingly, the thickness of the wood overlaid board 1 becomes 2/3 or less at the portions provided with time nick grooves 2. Consequently, the bending rigidity of the wood overlaid board 1 is reduced to the cube of 2/3, i.e., 8/27 or less, so that the wood overlaid board 1 is sufficiently flexible and light in weight. If the depth of the nick grooves 2 is increased excessively, the wood overlaid board 1 may be broken at the portions provided with the nick grooves 2, so that the depth of the nick grooves 2 is preferably 3/4 or less than the thickness of the wood overlaid board 1.

If the surface overlay layer 1b is composed of a thin WPC board, there is no possibility of breakage even when the depth of the nick grooves 2 is increased, for the strength of the WPC board has sufficiently been increased by the injected resin. Therefore, the use of the WPC board as the surface overlay layer 1b is preferable.

The flexible sheet 3 has bending elasticity which is sufficient to allow the flexible sheet 3 to sag by its own weight, and is layered on the wood overlaid board 1 by means of an adhesive 4. The adhesive 4 is composed of an adhesive that is flexible even after being cured such as polyurethane, vinylurethane, vinyl acetate, ethylene vinylacetate, or acrylic resin.

The type of the flexible sheet 3 is not particularly specified, but it can be composed of polyvinyl chloride, urethane resin, resin of synthetic rubber type such as chloroprene or butyl, polyester resin, or various reclaimed plastics. Preferably, the specific gravity of the flexible sheet 3 is made 1.0 or more by adding to these resins an appropriate amount of weighing powder composed of calcium carbonate, silica, alumina, carbon black, metallic powder, metallic oxide powder, or the like. In particular, if the specific gravity of the flexible sheet 3 is made 1.5 times or larger than the specific gravity of the wood overlaid board 1, the wood overlaid board 1 can surely obtain bending elasticity due to the weight of the flexible sheet 3, even when the Young's modulus in flexure of the wood overlaid board 1 has variations.

The thickness of the flexible sheet 3 is preferably 3 to 10 mm, so that the product of the specific gravity and thickness of the flexible sheet 3 is made larger than the product of the specific gravity and thickness of the wood overlaid board 1. In this manner, the center of gravity of the flooring material for building F is positioned inside the flexible sheet 3.

One side face along the longitudinal sides of the flooring material for building is provided with the tongue 5 from its end to end. The other side face along the longitudinal sides thereof is provided with the groove 6 from its end to end. By fitting the tongue 5 into the groove 6, adjacent pieces of the flooring material for building F are joined together.

The tongue 5 is formed by removing the upper edge of one side face of the wood overlaid board 1 so that its edge profile is L-shaped and by removing the lower edge of the corresponding side face of the underlying flexible sheet 3 so that its edge profile presents an inverted L. Consequently, the tongue 5 consists of an upper portion 5a which is composed of the lower remaining part of the wood overlaid board 1 and of a lower portion 5b which is composed of the upper remaining part of the flexible sheet 3. The upper portion 5a of the tongue 5 is divided into pieces by the nick grooves 2 mentioned above. However, these pieces are combined with the lower portion 5b of the tongue 5 that is composed of the flexible sheet 3.

The groove 6 is formed by removing the center of the other side face along the longitudinal sides of the flooring material for building F so that its edge profile presents a recumbent U. Consequently, the lower portion of the wood overlaid board 1 and the upper portion of the flexible sheet 3 are removed.

Figure 2:
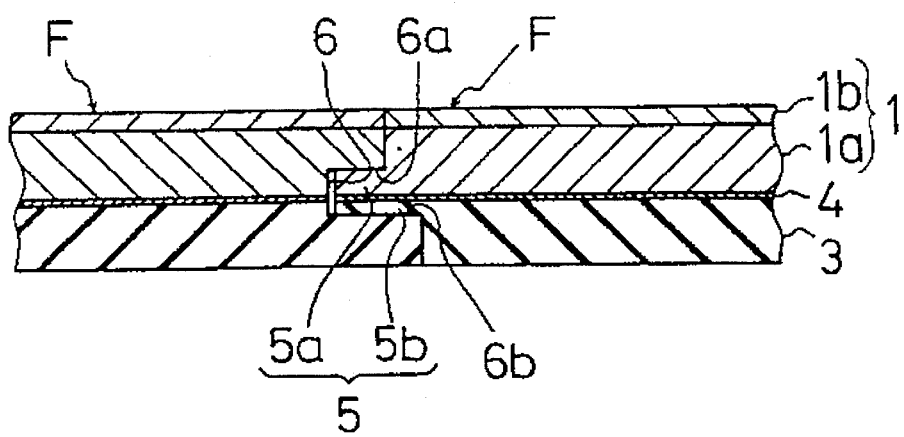
FIG. 2 is a cross section for illustrating a method of installing the above flooring material for building.
Figure 3:
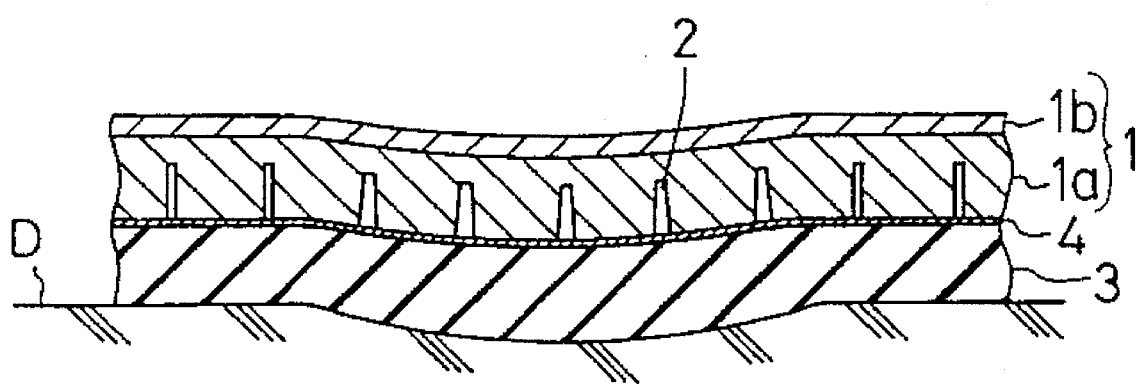
FIG. 3 is a cross section of the above flooring material for building being installed on an uneven subfloor.
Figure 4:
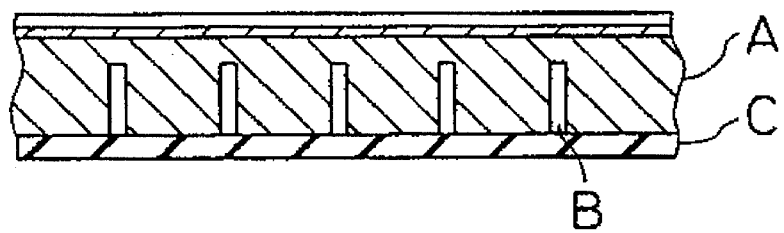
FIG. 4 is a cross section of a conventional flooring material for building.
Figure 5:
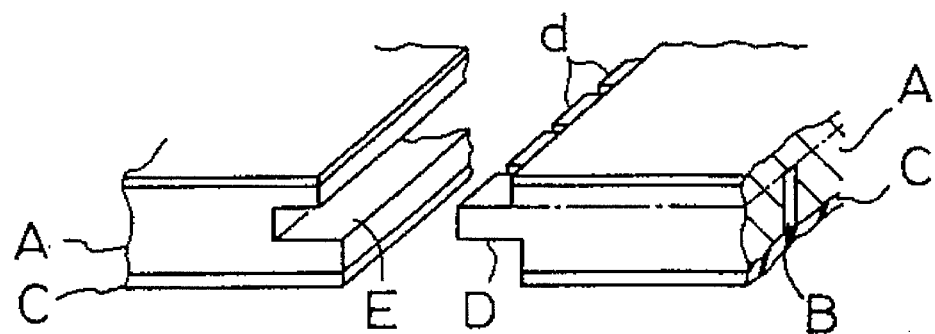
FIG. 5 is a cross section for illustrating a method of joining two pieces of the conventional flooring material for building.

Below, a method of installing on a subfloor D a flooring material for building F thus constituted will be described with reference to FIGS. 2 and 3. Adjacent pieces of the flooring material for building F are joined together by fitting the tongue 5 of one piece into the groove 6 of the other. The tongue 5 is securely pushed into the groove 6 with the back face of the tongue 5 being in contact with the base 6b of the groove 6. Meanwhile, the top surface of the tongue 5 is allowed to slide along the ceiling 6a of the groove 6, so that the tongue 5 is fitted into the groove 6.

In this case, since each of the upper portion 5a of the tongue 5 and the ceiling 6a of the groove 6 is made of the wood overlaid board having rigidity, the ceiling 6a of the groove 6 is not thrust up by the tongue 5 being pushed into the groove 6, so that the back face of the tongue 5 is pressed onto the base 6b of the groove 6. On the other hand, since each of the lower portion 5b of the tongue 5 and the base 6b of the groove 6 is made of the flexible sheet 3 having elasticity, the tongue 5 is securely fitted into the groove 6 while these two parts are elastically deformed. Even in the case where the wood overlaid board 1 is slightly warped or distorted, the warp or distortion is absorbed by the lower portion 5b of the tongue 5 and by the base 6b of the groove 6 while they are elastically deformed. Consequently, the joint of adjacent pieces of the flooring material for building F is free from the generation of a difference in level or space, so that the flooring material for building F can be installed with high precision.

As described above, even if the warped or distorted flooring material for building F is installed on the flat subfloor D or if the flat flooring material for building F is installed on the uneven subfloor D, the center of gravity of the flooring material for building F is kept inside the flexible sheet 3 by making the product of the specific gravity and thickness of the flexible sheet 3 larger than the product of the specific gravity and thickness of the wood overlaid board 1. Consequently, the weight of the flexible sheet 3 surmounts the rigidity of the wood overlaid board 1, and the flexible sheet 3 deforms itself in accordance with the surface configuration of the subfloor D so as to fit the subfloor D, while the wood overlaid board 1 is deformed along with the flexible sheet 3. In other words, since the fitting property of the flexible sheet 3 with respect to the subfloor D excels the rigidity of the wood overlaid board 1, even the warped or distorted wood overlaid board 1 would deform itself in accordance with the surface configuration of the subfloor D. Hence, the flooring material for building F deforms itself by self-adaptation in accordance with the configuration of the subfloor D without the application of an external force.

The rigidity of the wood overlaid board 1 is determined by its Young's modulus in flexure and specific gravity. The weight of the flexible sheet 3 is determined by its specific gravity and thickness. Since the typical Young's modulus in flexure and specific gravity of the wood overlaid board 1 are 30 to $200 \times 10^3$ kg/cm$^3$=and 0.5 to 0.9, respectively, its warp and distortion cannot be canceled only with the uniform load by the weight of the wood overlaid board 1. In this case, however, since the heavy flexible sheet 3 is integrally layered on the back face of the wood overlaid board 1 so as to position the center of gravity of the flooring material for building F inside the flexible sheet 3, the flooring material for building F has an excellent fitting property with respect to the subfloor D. In other words, the flooring material for building F has self-adaptability to the subfloor D.

Since the lower portion of the wood overlaid board 1 is provided with the nick grooves 2, the bending rigidity of the wood overlaid board 1 is reduced to the cube of the dimension obtained by subtracting the depth of the nick grooves 2 from the thickness of the wood overlaid board 1. In addition to the reduction of rigidity, flexibility is conferred on the wood overlaid board 1 by the weight of the flexible sheet 3 mentioned above, so that the self-adaptability of the flooring material for building F is further improved.

Although the flooring material for building F in the above embodiment is in the shape of a rectangle, it can also be used for raft flooring in which a combination of slats are disposed on a subfloor by gradually shifting their side-matched joints in their longitudinal direction.

EXAMPLE 1

A wood overlaid board 1 (specific gravity: 0.65) is 910 mm long and 91 mm wide and consists of a single overlay board made of oak having a thickness of 1.2 mm and of a 4-ply board having a thickness of 5.5 mm which has been layered on the back face of the single overlay board of oak. The lower portion of the wood overlaid board 1 is provided with nick grooves 2 having a depth of 2.5 mm, which are spaced at intervals of 15 mm. On the back face of the wood overlaid board 1 is integrally layered a flexible sheet 3 (specific gravity: 1.8) made of reclaimed vinyl chloride containing calcium carbonate having a thickness of 4 mm by means of an adhesive made of one-part urethane. Among the sides defining the flooring material for building F, two adjacent sides are provided with tongues 5, while the other two adjacent sides are provided with grooves 6.

EXAMPLE 2

A wood overlaid board 1 (specific gravity: 0.7) has the same dimensions as those of the wood overlaid board 1 used in Example 1 and consists of a single wood overlay board made of oak having a thickness of 1.2 mm and a 5-ply board having a thickness of 10 mm. The lower portion of the wood overlaid board 1 is provided with nick grooves 2 having a depth of 7.5 mm, which are spaced at intervals of 15 mm. The flexible sheet 3, adhesive, tongues 5, and grooves 6 used here are the same as those used in Example 1.

Comparative Example 1

A wood overlaid board 1 (specific gravity: 0.7) has the same dimensions as those of the wood overlaid board 1 used in Example 1 and consists of a single wood overlay board made of oak having a thickness of 0.3 mm and a 6-ply board having a thickness of 9 mm which also includes the thickness of the single overlay board of oak. The lower portion of the wood overlaid board 1 is provided with nick grooves 2 having a depth of 6.5 mm which are spaced at intervals of 15 mm. On the back face of the wood overlaid board 1 is integrally layered a flexible sheet (specific gravity: 1.6) having a thickness of 3 mm by means of an adhesive. The adhesive, tongues 5, and grooves 6 used here are the same as those used in Example 1.

For each of the above flooring materials for building of Examples 1 and 2 and Comparative Example 1, 40 pieces (area: about 3.3 m$^2$) were prepared and placed on a subfloor composed of concrete slab without using an adhesive. As a result, the flooring materials for building of Examples 1 and 2 were free from lifting up and squeaking. However, the flooring material for building of Comparative Example 1 was lifted up and squeaked.

When the amounts of deflection of the flooring materials of Example 1 and Comparative Example 1 due to their own weights were measured while supporting them with a span of 80 cm, they were 41 mm and 9 mm, respectively. The difference in measurements can be considered to result in the difference in fitting property with respect to the subfloor.

We claim:

1. A flooring material for building comprising:
a wood overlaid board having a pair of side faces parallel to each other; and a flexible sheet having bending elasticity which is integrally layered on a back face of said wood overlaid board, wherein
a lower portion of said wood overlaid board is provided with a plurality of nick grooves which extend from one side face to the other side face, said nick grooves being formed to such a depth and at such an interval as to impact said wood overlaid board with flexibility,
said flexible sheet has substantially the same area as that of said wood overlaid board, and
the product of the specific gravity and thickness of said flexible sheet is larger than the product of the specific gravity and thickness of said wood overlaid board and the specific gravity of said flexible sheet is larger than the specific gravity of said wood overlaid board so as to position the center of gravity of said flooring material for building in said flexible sheet.

2. A flooring material for building according to claim 1, wherein the specific gravity of said wood overlaid board is 0.5 to 0.9 and the specific gravity of said flexible sheet is 1.0 or more.

3. A flooring material for building according to claim 1, wherein the specific gravity of said flexible sheet if 1.5 times or larger than the specific gravity of said wood overlaid board.

4. A flooring material for building according to claim 1, wherein said wood overlaid board includes a base board and a surface overlay layer integrally formed on said base board, said surface overlay layer being made of a wood plastic combination.

5. A flooring material for building comprising:

a wood overlaid batten board having a pair of side faces which extend in a longitudinal direction and in parallel to each other; and a flexible batten sheet having bending elasticity which is integrally layered on a back face of said wood overlaid board, wherein a lower portion of said wood overlaid board is provided with a plurality of nick grooves which extend from one side face to the other side face, said nick grooves being formed to such a depth and at such an interval as to impart said wood overlaid board with flexibility, said one side face is provided with a tongue, the upper portion of said tongue consisting of the lower portion of said wood overlaid board which has been divided into pieces by said nick grooves, while the lower portion of said tongue consisting of said flexible sheet, the individual pieces of the upper portion of said tongue generated by said nick grooves being combined with said flexible sheet, and said other side face is provided with a groove which ranges from said wood overlaid board to said flexible sheet, wherein the product of the specific gravity and thickness of said flexible sheet is larger than the product of the specific gravity and thickness of said wood overlaid board so as to position the center of gravity of said flooring material for building in said flexible sheet.

6. A flooring material for building according to claim 5, wherein said flexible sheet is integrated with said wood overlaid board by means of an adhesive having flexibility.

7. A flooring material for building according to claim 5, wherein said wood overlaid board includes a base board and a surface overlay layer integrally formed on said base board, said surface overlay layer being made of a wood plastic combination.

* * * * *